(12) United States Patent
Hon et al.

(10) Patent No.: US 10,491,587 B2
(45) Date of Patent: *Nov. 26, 2019

(54) METHOD AND DEVICE FOR INFORMATION SYSTEM ACCESS AUTHENTICATION

(71) Applicant: Singou Technology Ltd., Tortola (VG)

(72) Inventors: Chin Tin Hon, Macau (CN); Chan Heng Tam, Macau (CN); Tai-Hua Ma, Macau (CN)

(73) Assignee: SINGOU TECHNOLOGY LTD., Tortola (VG)

( * ) Notice: Subject to any disclaimer, the term of this patent is extended or adjusted under 35 U.S.C. 154(b) by 135 days.

This patent is subject to a terminal disclaimer.

(21) Appl. No.: 15/654,739

(22) Filed: Jul. 20, 2017

(65) Prior Publication Data

US 2017/0324729 A1 Nov. 9, 2017

Related U.S. Application Data

(63) Continuation-in-part of application No. 15/032,182, filed as application No. PCT/CN2014/088271 on Oct. 10, 2014.

(30) Foreign Application Priority Data

Oct. 28, 2013 (CN) .......................... 2013 1 0518076

(51) Int. Cl.
*H04L 29/06* (2006.01)
*H04W 12/06* (2009.01)
(Continued)

(52) U.S. Cl.
CPC .......... *H04L 63/083* (2013.01); *G06F 16/951* (2019.01); *H04W 12/06* (2013.01);
(Continued)

(58) Field of Classification Search
CPC ..... H04L 63/18; H04L 63/0853; H04L 63/08; H04L 63/083; H04L 63/107;
(Continued)

(56) References Cited

U.S. PATENT DOCUMENTS 7,698,442 B1 * 4/2010 Krishnamurthy ....... G06F 21/51
709/203
7,769,820 B1 * 8/2010 Spies ..................... H04L 63/08
709/218
(Continued)

FOREIGN PATENT DOCUMENTS

CN 101286848 10/2008
CN 102043804 5/2011
(Continued)

OTHER PUBLICATIONS

Chuang, Jun-Chou, Yu-Chen Hu, and Hsien-Ju Ko. "A novel secret sharing technique using QR code." International Journal of Image Processing 4.5 (2010): 468-475. (Year: 2010).*
(Continued)

*Primary Examiner* — Michael Simitoski
(74) *Attorney, Agent, or Firm* — Eagle IP Limited; Jacqueline C. Lui

(57) ABSTRACT

A method is provided to improve authentication of a user to login with a client device to a computer system. A mobile device stores a list of Uniform Resource Locators (URLs), user names and passwords. The mobile device reads an authentication code displayed on a display of the client device to extract a URL and a session identifier (ID), searches a user name and a password associated with the URL in the list of URLs, user names and passwords, transmits the user name, the password, and the session ID to a gateway server when the user name and the password associated with the URL are found in the list, and authenticates the user to login to the computer system with the
(Continued)

client device when the client device retrieves from the gateway server the user name and the password.

11 Claims, 10 Drawing Sheets

(51) Int. Cl.
  *G06F 16/951* (2019.01)
  *H04L 12/08* (2006.01)
  *H04W 12/08* (2009.01)
  *H04W 12/00* (2009.01)
(52) U.S. Cl.
  CPC .......... *H04L 63/101* (2013.01); *H04L 63/105* (2013.01); *H04L 63/107* (2013.01); *H04L 63/1483* (2013.01); *H04W 12/00522* (2019.01); *H04W 12/08* (2013.01)
(58) Field of Classification Search
  CPC ............... H04L 63/102; H04L 63/0492; H04L 2463/082; H04L 9/085; H04L 9/3215; H04L 9/0894; H04W 12/06; H04W 4/02; G06F 21/31; G06F 21/36; G06F 21/40; G06F 21/34; G06F 21/42; G06F 16/9554
  See application file for complete search history.

(56) References Cited

U.S. PATENT DOCUMENTS

| | | | | |
|---|---|---|---|---|
| 7,954,698 | B1* | 6/2011 | Pliha | G06Q 40/02 235/379 |
| 8,256,664 | B1* | 9/2012 | Balfanz | H04L 63/08 235/375 |
| 8,474,028 | B2* | 6/2013 | Kulkarni | H04L 63/08 380/229 |
| 8,839,386 | B2* | 9/2014 | Gilboy | H04L 63/08 726/7 |
| 8,984,640 | B1* | 3/2015 | Emigh | H04L 63/1441 726/25 |
| 9,203,824 | B1* | 12/2015 | Nunn | H04L 63/08 |
| 9,756,056 | B2* | 9/2017 | Churyumov | G06F 21/43 |
| 9,848,324 | B1* | 12/2017 | Abene | G06F 21/35 |
| 9,954,846 | B2* | 4/2018 | Butterfield | H04L 63/08 |
| 2004/0019807 | A1* | 1/2004 | Freund | H04L 63/0227 726/1 |
| 2006/0156012 | A1* | 7/2006 | Beeson | H04L 9/3226 713/180 |
| 2006/0253584 | A1* | 11/2006 | Dixon | G06Q 30/02 709/225 |
| 2008/0022384 | A1* | 1/2008 | Yee | H04L 63/0263 726/11 |
| 2008/0060062 | A1* | 3/2008 | Lord | G06F 21/33 726/5 |
| 2008/0072049 | A1* | 3/2008 | Cross | G06F 21/51 713/176 |
| 2008/0086764 | A1* | 4/2008 | Kulkarni | G06F 21/33 726/7 |
| 2008/0086767 | A1* | 4/2008 | Kulkarni | H04L 63/08 726/9 |
| 2008/0201576 | A1* | 8/2008 | Kitagawa | H04L 63/08 713/168 |
| 2009/0037976 | A1* | 2/2009 | Teo | G06F 21/566 726/1 |
| 2010/0218241 | A1* | 8/2010 | Faryna | G06F 21/35 726/5 |
| 2010/0306542 | A1* | 12/2010 | Funk | H04L 9/0822 713/171 |
| 2011/0219427 | A1* | 9/2011 | Hito | G06F 21/00 726/3 |
| 2011/0270751 | A1* | 11/2011 | Csinger | G06F 21/40 705/42 |
| 2012/0158626 | A1* | 6/2012 | Zhu | G06F 21/56 706/13 |
| 2013/0159195 | A1* | 6/2013 | Kirillin | G06Q 20/322 705/71 |
| 2013/0179692 | A1 | 7/2013 | Tolba et al. | |
| 2013/0185210 | A1* | 7/2013 | Dodson | H04L 63/08 705/44 |
| 2013/0219072 | A1* | 8/2013 | Han | H04L 65/60 709/228 |
| 2013/0269013 | A1* | 10/2013 | Parry | H04L 63/0861 726/7 |
| 2014/0040628 | A1* | 2/2014 | Fort | G06F 21/34 713/182 |
| 2014/0041003 | A1* | 2/2014 | Wappenschmidt | H04L 63/083 726/7 |
| 2014/0047519 | A1* | 2/2014 | Faryna | G06F 21/35 726/5 |
| 2014/0223175 | A1* | 8/2014 | Bhatnagar | G09C 5/00 713/159 |
| 2014/0282961 | A1* | 9/2014 | Dorfman | H04L 63/0823 726/7 |
| 2014/0316991 | A1* | 10/2014 | Moshal | G06Q 20/14 705/64 |
| 2015/0007259 | A1* | 1/2015 | Peterson | G06F 21/54 726/1 |
| 2015/0213527 | A1* | 7/2015 | Moshal | G06Q 20/14 705/51 |
| 2015/0261948 | A1* | 9/2015 | Marra | G06F 21/34 726/4 |
| 2015/0281229 | A1* | 10/2015 | Kang | H04L 63/0853 713/185 |
| 2015/0312759 | A1* | 10/2015 | Kim | G06F 21/10 455/411 |
| 2016/0162875 | A1* | 6/2016 | DeSoto | H04W 12/06 705/21 |
| 2016/0183164 | A1* | 6/2016 | Pelkey | H04L 63/20 455/456.1 |
| 2016/0191506 | A1* | 6/2016 | Wang | H04L 63/0853 726/7 |
| 2016/0269181 | A1* | 9/2016 | Hon | H04L 9/3226 |
| 2016/0286396 | A1* | 9/2016 | Tuukkanen | G06F 21/40 |
| 2016/0294821 | A1* | 10/2016 | Neuman | H04L 63/08 |
| 2016/0308678 | A1* | 10/2016 | Bhatnagar | G09C 5/00 |
| 2016/0323290 | A1* | 11/2016 | Stead | H04L 63/0838 |
| 2016/0373428 | A1* | 12/2016 | Shi | H04L 63/18 |
| 2017/0046665 | A1* | 2/2017 | Sheehan | G06Q 20/10 |
| 2017/0061432 | A1* | 3/2017 | Ekambaram | G06Q 20/405 |
| 2017/0064548 | A1* | 3/2017 | Wappenschmidt | H04L 63/0492 |
| 2017/0086069 | A1* | 3/2017 | Liu | H04W 12/06 |
| 2017/0163623 | A1* | 6/2017 | Fouad | H04L 63/083 |
| 2017/0244683 | A1* | 8/2017 | Mohamed | H04L 63/18 |
| 2017/0289806 | A1* | 10/2017 | Girdhar | H04W 4/70 |
| 2017/0296710 | A9* | 10/2017 | Kulkarni | A61L 31/145 |
| 2017/0324729 | A1* | 11/2017 | Hon | H04L 63/083 |
| 2017/0329966 | A1* | 11/2017 | Koganti | G06F 21/554 |
| 2018/0004930 | A1* | 1/2018 | Csinger | G06F 21/40 |
| 2018/0026796 | A1* | 1/2018 | Oberheide | H04L 9/3247 713/176 |
| 2018/0047016 | A1* | 2/2018 | Sarin | G06Q 20/3674 |
| 2018/0083958 | A1* | 3/2018 | Avilov | H04L 63/083 |
| 2018/0121636 | A1* | 5/2018 | Schiffman | G06F 21/31 |
| 2018/0121655 | A1* | 5/2018 | Abene | H04W 12/06 |
| 2018/0159847 | A1* | 6/2018 | Dorfman | H04L 63/0823 |
| 2018/0332125 | A1* | 11/2018 | Tang | G06K 7/1417 |

FOREIGN PATENT DOCUMENTS

| | | |
|---|---|---|
| CN | 102202040 | 9/2011 |
| CN | 102651739 | 8/2012 |

(56) References Cited

FOREIGN PATENT DOCUMENTS

CN  102957701  3/2013
WO  WO2012064055  5/2012

OTHER PUBLICATIONS

Venukumar, Vishnu, and Vinod Pathari. "Multi-factor authentication using threshold cryptography." Advances in Computing, Communications and Informatics (ICACCI), 2016 International Conference on. IEEE, 2016. (Year: 2016).*

* cited by examiner

METHOD AND DEVICE FOR INFORMATION SYSTEM ACCESS AUTHENTICATION

FIELD OF THE INVENTION

The present disclosure relates generally to the field of information security technology, and more particularly, to a method and a device for information system access authentication.

BACKGROUND

Almost all the network information systems or internet information systems provide a login function that requires a user to be logged in to have access to acquire the service. The user login information is confidential. When a user logs in with a public computer or computer invaded by a Trojan horse, a computer virus or a computer worm, there is a serious risk of information disclosure. In addition, the user login information is vulnerable to phishing attacks that the login account may be stolen or hijacked.

The traditional network information systems or internet information systems implement the user login function by a login method including:

1. receiving a request for login from a user, and appearing a login interface of an information system on the client side;

2. receiving a user name and a password input by the user on the login interface, wherein some service providers provide a verification code on the login interface, in order to prevent dictionary and brute force attacks; and 3. creating, by the information system, a logon session for the user, when the login is successful, and returning, by the information system, an error message to the client side, when the login is unsuccessful.

The above login method, as a single-factor authentication, is too simple, and is easy for users to fall into phishing scams. With the above login method, the user name and password may be stolen when the client side is infected by a Trojan horse virus, so the above login method is low in security.

SUMMARY OF THE INVENTION

In order to solve the above problems in the prior art, the present disclosure provides a method and device for information system access authentication, which can improve security without increasing the complexity of user login.

According to one aspect of the disclosure, a method for information access authentication is provided, including:

performing anonymous authentication to a random verification code generated according to a login request for accessing an information system of a client; and authenticating acquired user name and password information when the anonymous authentication is successful.

According to another aspect of the disclosure, a device for information system access authentication device is provided, including a verification code authentication module and a user name and password authentication module connected to the verification code authentication module. The verification code authentication module is configured to perform anonymous authentication to a random verification code generated according to a login request for accessing an information system of client; and the user name and password authentication module is configured to authenticate acquired user name and password information when the anonymous authentication is successful.

Compared with the prior art, the above method and device for information system access authentication have the following advantages. The user's login of the information system includes two stages: a first stage, including anonymous authentication, in which it is not required to provide the user name and password, and only the random verification code are acquired to be verified by a direct anonymous authentication method; and a second stage, including identifying information authentication, in which the user need to provide the user name and password for authentication. The authentication of two stages can effectively reduce the risk of the user login information leakage and improve security.

One example embodiment improves authentication of a user to login with a client device to a computer system. A mobile device stores a list of Uniform Resource Locators (URLs), user names and passwords. The mobile device reads an authentication code displayed on a display of the client device to extract a URL and a session identifier (ID), searches a user name and a password associated with the URL in the list of URLs, user names and passwords, transmits the user name, the password, and the session ID to a gateway server when the user name and the password associated with the URL are found in the list, and authenticates the user to login to the computer system with the client device when the client device retrieves from the gateway server the user name and the password.

Other example embodiments are discussed herein.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION OF THE
PREFERRED EMBODIMENTS

Specific embodiments of the method for information system access authentication according to the present disclosure will be described in detail taken in conjunction with the accompanying drawings.

Figure 1:
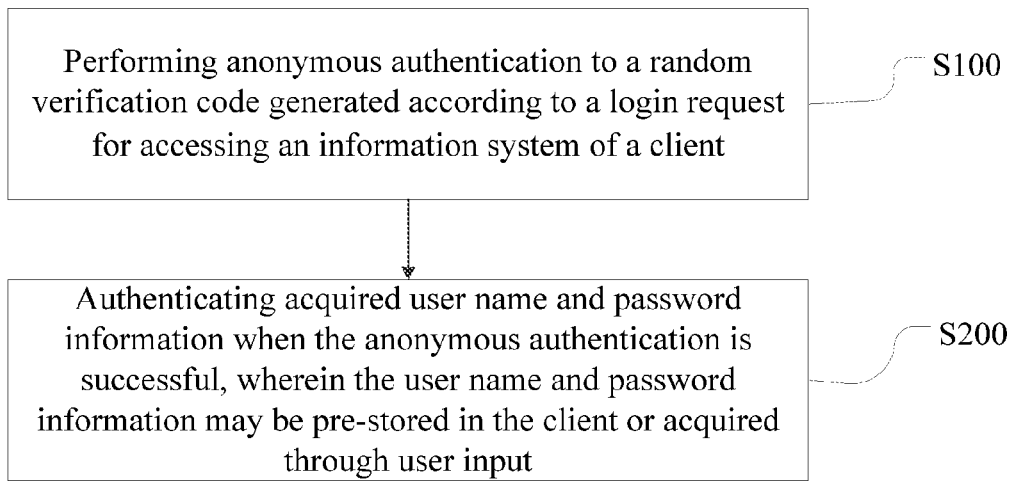
FIG. 1 is a flow diagram illustrating a method for information system access authentication according to one embodiment of the present disclosure.

As shown in FIG. 1, a method for information system access authentication is provided, including the following steps:

Step S100, performing anonymous authentication to a random verification code generated according to a login request for accessing an information system of a client.

The client may be a World Wide Web application client, namely Web browser client, or may be a client of the information system. The random verification code acts as Challenge information for anonymous authentication.

Step S200, authenticating acquired user name and password information when the anonymous authentication is successful, wherein the user name and password information may be pre-stored in the client or acquired through user input.

Figure 2:
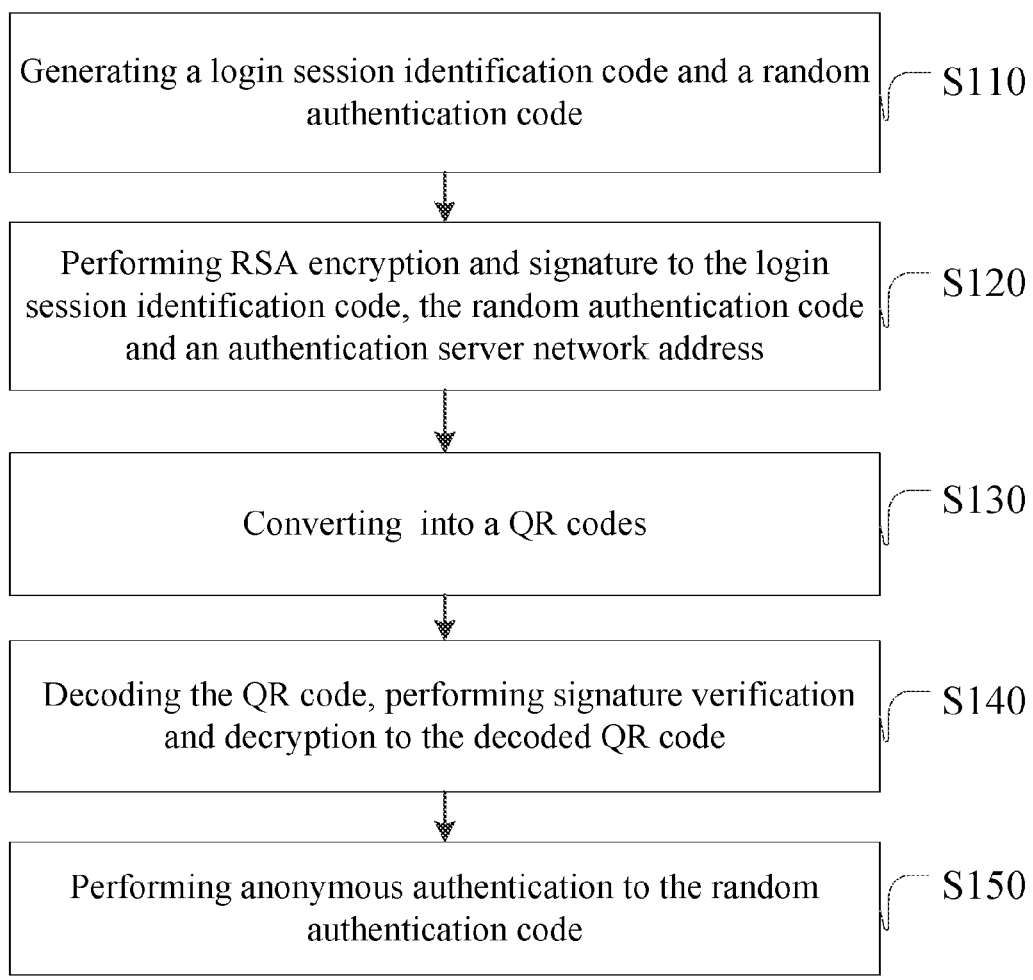
FIG. 2 is a flow diagram illustrating a process of performing anonymous authentication to a random verification code according to one embodiment of the present disclosure.

There are a variety of ways to implement the anonymous authentication to the random verification code in step S100, for example, in one embodiment, as shown in FIG. 2, the step S100 may include:

Step S110, generating a login session identification code and a random verification code according to a login request of the client for accessing the information system.

The login session identification code is temporary and unique, which facilitates to store based on entities and query and retrieve the entities one by one;

Step S120, performing RSA (asymmetric cryptographic algorithm) encryption and signature to the login session identification code, the random verification code and an authentication server network address with an information system private key and a user public key.

The authentication server may provide a function of registration of a client, that is, after an authentication application is installed in the client, the client should firstly be registered in the authentication server, and the client may create a link with the authentication server at any time through linking to the authentication server network address for authentication. The known techniques in the prior art can achieve the RSA encryption and signature, and the transmission of the authentication information is more secure and reliable when with the help of the asymmetric cryptographic technique.

Step S130, converting the encrypted and signed login session identification code, random verification code and authentication server network address into a QR (Quick Response) code. The known QR code conversion software or program in the prior art can achieve the QR code conversion. The transmission of the authentication information is more secure and reliable with the help of the asymmetric cryptographic technique.

Step S140, decoding the QR code, and performing signature verification and decryption to the decoded QR code with the information system private key and the user public key to obtain the login session identification code, the random verification code and authentication server network address.

The known method in the prior art can achieve the decoding of the QR code. For example, for a mobile phone with a camera in which an application of a QR code scanning function is installed, the QR code can be scanned for input with the assistance of an application in the prior art, to improve the user's operation experience. The known technology in the prior art can also achieve the signature authentication and decryption.

Step S150, performing anonymous authentication to the random verification code through linking to the authentication server network address.

The client may acquire the authentication server network address from the QR code, and the client may link to the authentication server through the authentication server network address, to verify the random verification code to authenticate that the user know the QR code, and to provide an anonymous authentication which can authenticate the user belongs to trusted users of information system.

Figure 3:
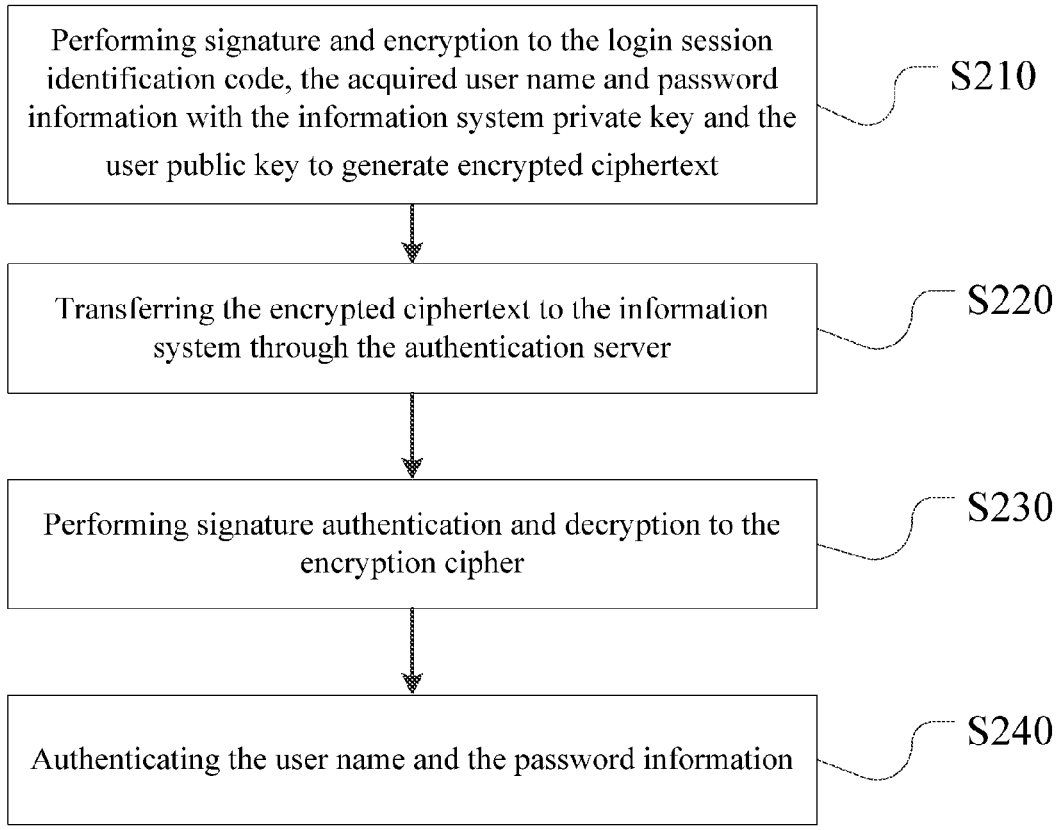
FIG. 3 is a flow diagram illustrating a process of authenticating information of a user name and a password according to one embodiment of the present disclosure.

There are a variety of ways to implement the authentication of the user name and password information in step S200, for example, in one embodiment, as shown in FIG. 3, the authentication of the user name and the password information in the step S200 may include:

Step S210, performing signature and encryption to the login session identification code, the acquired user name and password information with the information system private key and the user public key to generate encrypted ciphertext;

Step S220, transferring the encrypted ciphertext to the information system through the authentication server.

The client may link to the network address of the authentication server and transfer the encrypted ciphertext to the authentication server, then authentication server may transfer the encrypted ciphertext to the information system. The authentication server allows the user to provide login authentication function through the authentication server.

Step S230, performing signature authentication and decryption to the encryption cipher with the information system private key and the user public key to obtain the login session identification code, the user name and the password information.

Step S240, authenticating the user name and the password information, so that if the authentication is successful, the login of the information system access is completed.

In one embodiment, before step S110, it may further include acquiring a user login interface according to the login request for accessing.

After the step S130, it may further include displaying the QR code on the user login interface.

In order to facilitate to judge whether the anonymous authentication to the random verification code is successful, whether the second stage of authentication can be processed, whether the authentication to the user name and the password information in the second stage is successful and whether the login is successfully completed, in one embodiment, after the step S150, it may further include: returning a response message, determining, by the information system, whether the anonymous authentication is successful according to the response message, so that the information system informs the authentication server to perform the second stage of authentication when the anonymous authentication is successful, and no second stage of authentication is performed when anonymous authentication is unsuccessful.

After the step S240, it may further include: returning a successful login message when the authentication is successful, so that the user completes the login; and returning an error message when the password information mismatches with the user name or the user name or the password information is invalid, so that the user's login fails.

In one embodiment, the client may include a smart phone or a mobile terminal, in which an application having a function of QR code scanning and a property of network connection is installed. The application can scan the QR code, log in the authentication server and link the authentication server.

Based on the same invention concept, the present disclosure also provides a device for information system access authentication, the specific embodiments of which will be described in detail taken in conjunction with the accompanying drawings.

Figure 4:
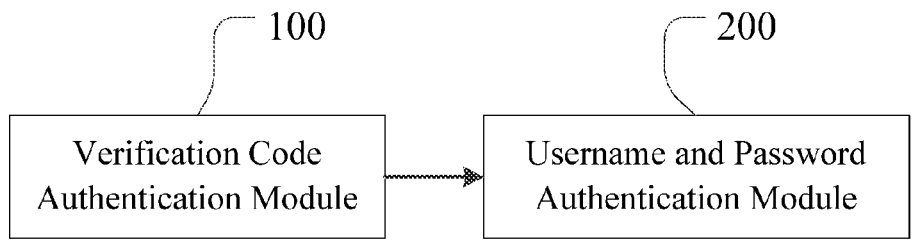
FIG. 4 is a schematic diagram illustrating a device for information system access authentication according to one embodiment of the present disclosure.

As shown in FIG. 4, a device for information system access authentication includes an verification code authentication module 100 and a user name and password authentication module 200 connected to the verification code authentication module 100. The verification code authentication module 100 is configured to perform anonymous authentication to a random verification code generated according to a login request for accessing an information system of client; and user name and password authentication module 200 is configured to authenticate acquired user name and password information when the anonymous authentication is successful.

Figure 5:
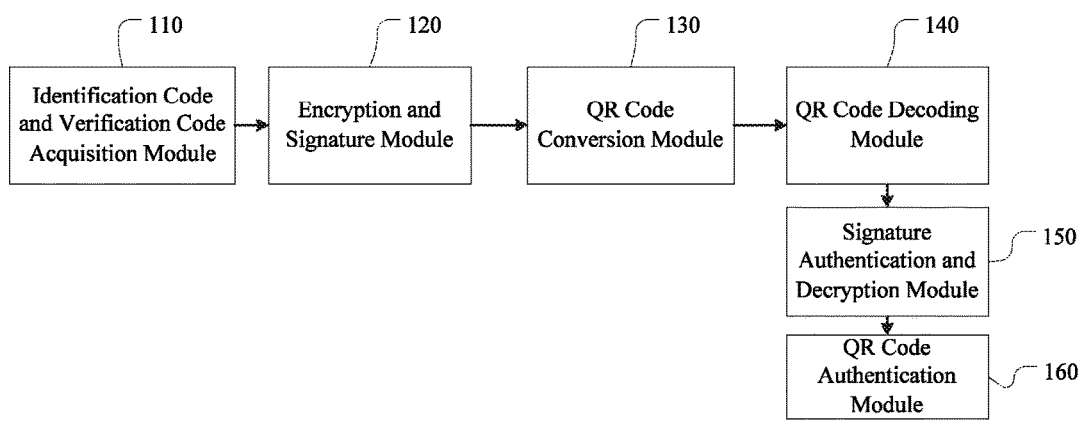
FIG. 5 is a schematic diagram illustrating a verification code authentication module according to one embodiment of the present disclosure.

There are a variety of ways for the verification code authentication module 100 to perform anonymous authentication to the random verification code, for example, in one embodiment, as shown in FIG. 5, the verification code authentication module 100 may include:

an identification code and verification code acquisition module 110, configured to generate a login session identification code and a random verification code according to a login request of the client for accessing the information system;

an encryption and signature module 120, configured to performing RSA encryption and signature to the login session identification code, the random verification code and an authentication server network address with an information system private key and a user public key;

a QR code conversion module 130, configured to convert the encrypted and signed login session identification code, random verification code and authentication server network address into a QR code;

a QR code decoding module 140, configured to decode the QR code;

a signature authentication and decryption module 150, configured to perform signature authentication and decryption to the decoded QR code with the information system private key and the user public key to obtain the login session identification code, the random verification code and authentication server network address; and a QR code authentication module 160, configured to link the authentication server network address to perform anonymous authentication to the random verification code.

Figure 6:
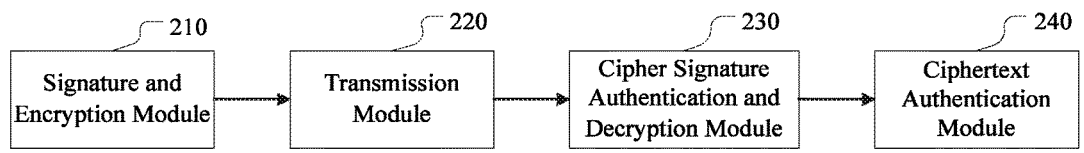
FIG. 6 is a schematic diagram illustrating a user name and password authentication module according to one embodiment of the present disclosure.

There are a variety of ways for the user name and password authentication module 200 to authenticate the user name and the password information, for example, in one embodiment, as shown in FIG. 6, the user name and password authentication module 200 may include:

a signature and encryption module 210, configured to perform signature and encryption to the login session identification code, the acquired user name and password information with the information system private key and the user public key to generate an encrypted ciphertext;

a transmission module 220, configured to transfer the encrypted ciphertext to the information system through the authentication server;

an encrypted ciphertext signature authentication and decryption module 230, configured to perform signature authentication and decryption to the encryption cipher with the information system private key and the user public key to obtain the login session identification code, the user name and the password information; and a ciphertext authentication module 240, configured to authenticate the user name and the password information, so that if the authentication is successful, the login of the information system access is completed.

In one embodiment, the device may further include a user login interface acquisition module and a QR code display module. The user login interface acquisition module is configured to acquire a user login interface according to the login request for accessing; and the QR code display module is configured to display the QR code.

The QR code display module may display the QR code on the user login interface after the QR code conversion module converting the encrypted and signed login session identification code, random verification code and authentication server network address into the QR code.

In order to facilitate to judge whether the anonymous authentication to the random verification code is successful, whether the second stage of authentication can be processed, whether the authentication to the user name and the password information in the second stage is successful and whether the login is successfully completed, in one embodiment, the QR code authentication module 160 is further configured to return a response message after performing anonymous authentication to the random verification code, and the information system may determine whether the anonymous authentication is successful according to the response message.

The cipher authentication module 240 is further configured to return a successful login message when the authentication is successful, and return an error message when the password information mismatches with the user name or the user name or the password information is invalid, after authenticating the user name and the password information.

In one embodiment, the client may include a smart phone or a mobile terminal.

Figure 7:
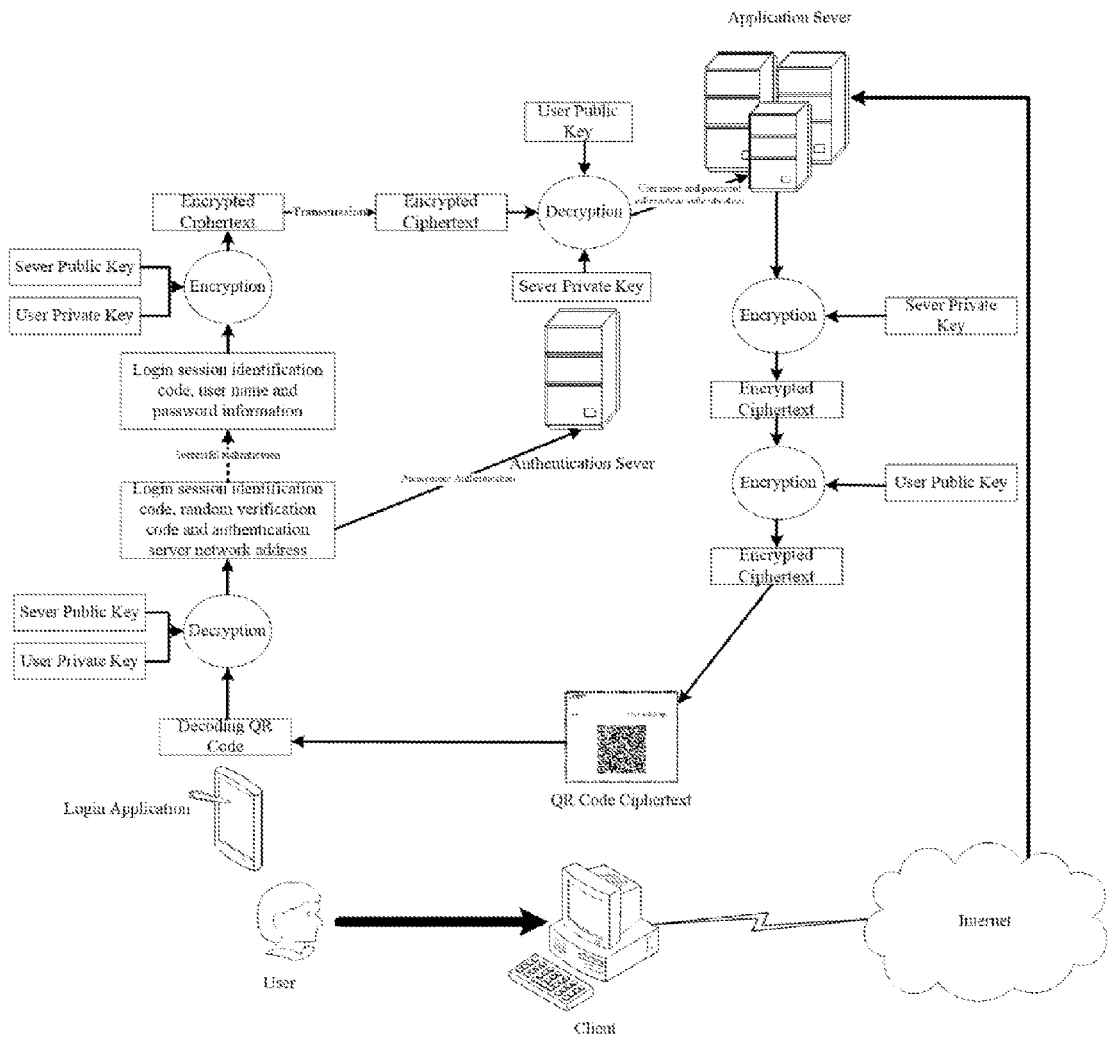
FIG. 7 is a flow diagram illustrating operational processes of a device for information system access authentication according to one embodiment of the present disclosure.

The concrete operational processes of the device may be best understood by reference to the following description taken in conjunction with an exemplary embodiment. As shown in FIG. 7, the application server is the information system of the present disclosure, and the login application has a function of QR code scanning and a property of network connection.

The client links the application server over the network, and sends a login request, and the application server returns a user login interface to the client;

the application server generates a login session identification code and a random verification code for the login request;

the application server performs RSA encryption and signature to the login session identification code, the random verification code and authentication server network address with the server private key and the user public key, to generate an encrypted ciphertext;

the application server converts the encrypted ciphertext into a QR code and display the QR code on the user login interface at the client;

the login application installed in the client scans the QR code through a camera device and decodes the QR code;

the login application decrypts the decoded QR code with the server private key and the user public key, to obtain the login session identification code, the random verification code and authentication server network address;

the login application links the authentication server to perform anonymous authentication to the random verification code, and the authentication server returns a response message;

the application server determines whether the anonymous authentication is successful according to the response message, and if the anonymous authentication is successful, the application server informs the authentication server to start the second stage of authentication;

the login application queries the user name and the password information stored in the client, and the user name and the password information can be also acquired by user input;

the login application performs encryption and signature to the login session identification code, the user name and the password information with the information system private key and the user public key to generate a new encrypted ciphertext;

the login application links the authentication server network address to transfer the new encrypted ciphertext to the authentication server;

the authentication server transfers the new encrypted ciphertext to the application server over the network;

the application server performs signature authentication and decryption to the new encrypted ciphertext with its own server private key and the user public key to obtain the login session identification code, the user name and password information; and the application server authenticates the user name and the password information, returns a successful login message when the authentication is successful and the login procedure is completed that the user's login is successful, and returns an error message when the authentication is unsuccessful.

Other technical features of the device are the same as the above method for information system access authentication, which need not be repeated here.

Compared with the prior art, the above method and device for information system access authentication has the following advantages.

1. The user's login of the information system includes two stages: a first stage, including anonymous authentication, in which it is not required to provide the user name and password, and it is only required to acquire the random verification code and verify the random verification code with a direct anonymous authentication method; and a second stage, including identifying information authentication, in which the user need to provide the user name and password for authentication. The authentication of two stages can effectively reduce the risk of the user login information leakage and improve security.

2. Two-factor authentication (i.e., QR code authentication and user name and password authentication) is required when a user logs in the information system, which combines the QR code technology and the asymmetric encryption technology to make the transmission of the authentication information more secure and reliable.

3. With the application software which facilitates the scanning of the QR code and the input of the password, the security is improved while the user's operation experience is also improved.

The embodiments are chosen and described in order to explain the principles of the disclosure and their practical application so as to activate those skilled in the art to utilize the disclosure and various embodiments, and are not intended to limit the scope of the present disclosure in any way. It would be understand by those skilled in the art that various changes and modifications can be made to the embodiments described herein without departing from the scope and spirit of the present disclosure. Accordingly, the scope of the present disclosure is defined by the appended claims rather than the foregoing description and the exemplary embodiments described therein.

Example embodiments relates to methods and systems that improve account security.

Users frequently login to their accounts to access a website or other systems such as a human management system (HMS) by providing (such as typing with a keyboard) their login credentials (e.g. user names and passwords) through a login interface of an insecure or untrusted device such as a publicly shared computer. An untrusted device may be implanted with or compromised by spyware such as key-logger spyware to steal users' credentials.

Many existing systems incorporate multi factor authentication (MFA) to enhance account security. In addition to login credentials, a user is required to provide an extra layer of information such as hardware token and a verification code (e.g. a one-time password (OTP)). However, for example, a hardware token such as a USB stick, a band card and a key must be carried around and is inconvenient. A one-time-valid, dynamitic passcode cannot identify and prevent hacking or fishing websites. A user's sensitive information such as login credentials suffers from unexpected leakage because the sensitive information must be input through a user interface such as a display of a computer without knowing whether the computer is trustworthy and whether a login interface is authentic. For example, a fishing website can still create a fake OTP that is sent to a user's mobile device for verification. In addition, the mobile device to which an OTP is sent is also likely to be stolen and used for illegal or nefarious activities.

Example embodiments solve the above technical problems by providing technical solutions in new methods and systems that improve account security. Example embodiments improve security technologies by adopting an unconventional two-stage or two-step authentication process in which a gateway server or authentication server or application server acts as a communication intermediary or tunnel that facilitates communication between a client device and a mobile device.

In an example embodiment, when a user attempts to login to his or her account at a client device (e.g., a publicly shared computer) through a login interface such as a webpage that has a Uniform Resource Locator (URL) and is hosted by a web server, a plugin such as a bookmarklet is activated to generate a request. A gateway server communicates with the client device over a network and establishes a session (such as a one-time random session) that corresponds to a session identifier (ID). The client device knows a status of the gateway server by polling, fetches the session ID, and creates an authentication code such as a Quick Response (QR) code into which the session ID and the URL are embedded. By reading the QR code, a mobile device that stores a list of URLs and user credentials (such as user names and passwords) extracts the session ID and the URL, and searches in the list to determine whether there is a user name and a password that are associated with the URL. When the user name and the password associated with the URL are found, the mobile device transmits to the gateway server the user name, the password and the session ID. The user name and the password are further fetched or retrieved by the client device for login.

Example embodiments improve security technologies by preventing or filtering fake websites, phishing, or other risky computer systems such as fake web servers because the computer system to which a user intends to login his or her account is authenticated before user credentials are provided. Thus, risk of sensitive information leakage or stolen is significantly reduced or even eliminated.

Example embodiments improve security technologies by preventing sensitive information leakage due to malware such as key-logger spyware because no user credentials are provided directly through a user interface (UI) of a client device (e.g. display screens, touchscreens, keyboards and computer mouse). Instead, user credentials are stored in a trusted mobile device and provided to the client device through a secure gateway server as an intermediary. Therefore, security of a user account is guaranteed even if the client device is implanted with malware or infected with a computer Trojan horse virus.

Example embodiments improve security technologies by storing user credentials in a secure and trusted mobile device rather than in a cloud server or other servers such as an application server. Example embodiments provide a single, secure, private safe in which users' private sensitive account information is stored and protected safely.

In an example embodiment, security is further improved by providing additional layers of security such as timestamp and geographical indicator such that a mobile device is only allowed to grant login during a specific period and/or within a specified geographical boundary.

Figure 8:
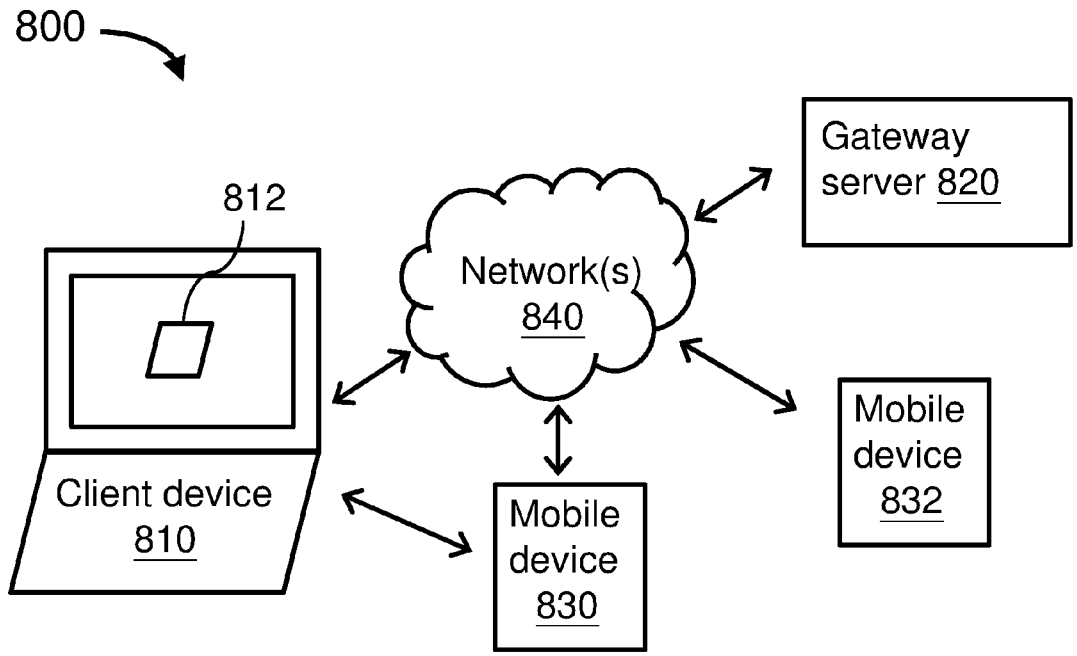
FIG. 8 is a graph illustrating an authentication environment in accordance with an example embodiment.

FIG. 8 shows an authentication environment in accordance with an example embodiment. The authentication environment 800 includes a client device or client side or terminal 810, a gateway server or authentication server 820, and a mobile device or portable electronic device (PED) 830. Both the client device 810 and the mobile device 830 communicate with the gateway server 820 via one or more networks 840.

By way of example, the client device 810 is a computer device such as a tablet computer, a notebook computer, a personal digital assistant (PDA), or other types of wireless or wired computing devices.

As an example, when a user attempts to login with the client device 810 to a computer system (e.g. a web server, a private firm's or a government's Internal Management System (IMS), etc.), the user does not need to input his or her user credentials (e.g. a user name and a password) on a user interface (such as a display screen) of the client device 810. Instead, the user activates software (e.g., plugin, bookmarklet, etc.) included in the client device 810 such that a request is created or generated to request the gateway server 820 to establish a session that corresponds to a unique session identifier (ID). The client device 810 knows a status of the gateway server 820 by polling and fetches or retrieves the session ID once the session is established. The client device 810 generates an authentication code 812 (e.g. machine readable barcode) that embeds information such as the session ID and a Uniform Resource Locator (URL) corresponding to a login interface hosted by the computer system to which the user intends to login. In this manner, leakage of the user's sensitive information is prevented even if the client device 810 is infected with spyware because no such sensitive information is provided at the client device 810.

By way of example, the client device 830 is a handheld PED such as a smart phone, or a wearable electronic device. The client device 830 stores a list of URLs and corresponding user credentials (e.g. user names and passwords). The mobile device 830 reads (such as scanning or imaging with a scanner or camera) the authentication code 812 that is provided by the client device 810 to extract a session ID and a URL that indicates a computer system to which a user intends to login. The mobile device 830 searches in its list to determine whether user credentials associated with the URL exist, and transmits the user credentials to the gateway server 820 when such user credentials exist.

By way of example, the user credentials, once received by the gateway server, are retrieved by the client device 810 for login. In this manner, the gateway server 820 acts as a communication intermediary or tunnel or bridge when user credentials are delivered from the mobile device 830 to the client device 810. Account security is improved because user credentials are stored in a trusted mobile device (e.g. the mobile device 830) and are not delivered before a computer system to which a user intends to login is verified. When delivered, the user credentials are communicated through a secure tunnel establish by a trusted gateway server (e.g., the gateway server 820) as an intermediary.

In an example embodiment, the authentication environment 800 includes a mobile device 832 that is remotely located from the client device 810. The client device 810 transmits over the network(s) 840 the generated authentication code 812 to the mobile device 832 for reading.

The network(s) 840 can be a single network or multiple networks, including, but not limited to, one or more of the Internet, peer-to-peer (P2P) network, cellular network, satellite network, personal area network (PAN), local area network (LAN), wide area network (WAN), storage area network (SAN), virtual private network (VPN), and other types of networks.

Figure 9:
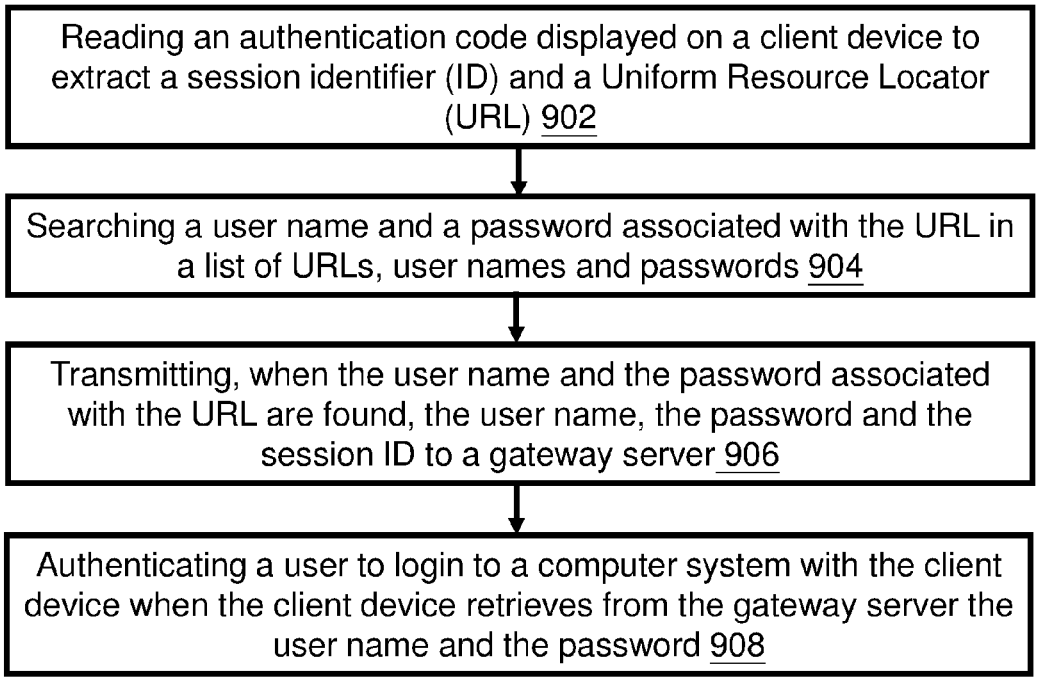
FIG. 9 is a flow chart illustrating an example method in accordance with an example embodiment.

FIG. 9 is a flow chart illustrating an example method in accordance with an example embodiment. The example method improves authentication of a user to login with a client device to a computer system (such as a computer network (e.g., a website hosted by a web server), a financial management system, a human resource management system, etc.).

The method as illustrated in FIG. 9 can be executed by a computer or an apparatus that incorporates a computer. For example, the method as illustrated in FIG. 9 can be executed by a mobile device as stated with reference to FIG. 8.

According to block 902, a mobile device reads an authentication code displayed on a display of the client device to extract a session ID and a URL. For illustrative purpose only, the URL is a reference to a resource location to which a user attempts to login, and the session ID identifies a session (such as a one-time random session) that is established with a client device by a gateway server.

According to block 904, the mobile device searches a user name and a password associated with the URL in a list of URLs, user names and passwords.

By way of example, the mobile device is a trusted device and stores a list of URLs, user names and passwords, where each URL has an associated or corresponding user name and password. URLs stored in the list are considered as authentic and trustworthy.

According to block 906, when the user name and the password associated with the URL are found, the mobile device transmits the user name, the password and the session ID to a gateway server.

By way of example, the session ID is used to identify the session such that the gateway server writes the user name and the password into the same session that is established by the gateway server to communicate with the client device.

According to block 908, the mobile device authenticates the user to login to the computer system with the client device when the client device retrieves from the gateway server the user name and the password transmitted by the mobile device to the gateway server.

In this manner, a computer system to which a user attempts to login is verified before user credentials are provided, and the user credentials are stored in and provided by a trusted mobile device through a secure gateway server, which improve security and avoid sensitive information leakage.

Figure 10:
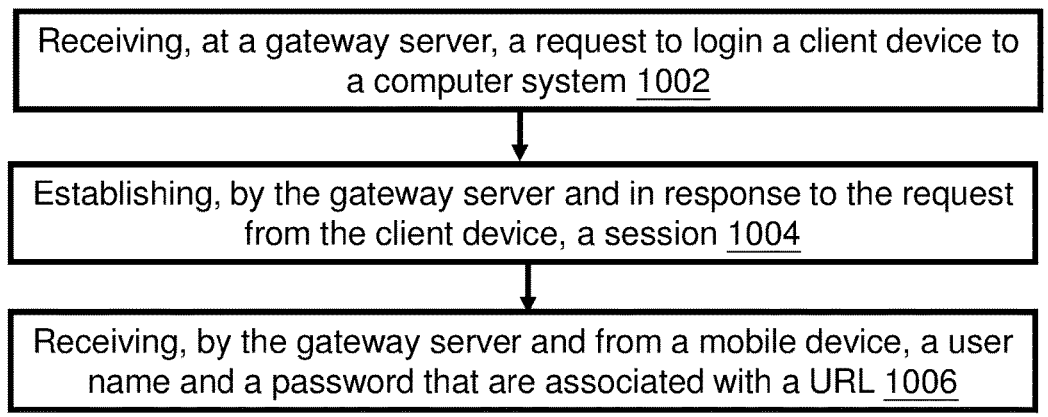
FIG. 10 is a flow chart illustrating an example method in accordance with an example embodiment.

FIG. 10 is a flow chart illustrating an example method in accordance with an example embodiment. The example method improves authentication of a client device that logins into a computer system.

The method as illustrated in FIG. 10 can be executed by a computer or an apparatus that incorporates a computer. For example, the method as illustrated in FIG. 10 can be executed by a gateway server as stated with reference to FIG. 8.

According to block 1002, a gateway server receives a request to login a client device to a computer system. For example, the computer system can be a computer network such as a web network and an entity's internal management system (e.g. human management system, account management system, etc.).

According to block 1004, the gateway server establishes a session (such as a one-time random session) in response to the request from the client device. For example, the session is established to help communication between the client device and a trusted mobile device that stores a list of URLs and user credentials. The session corresponds to a unique session ID that identifies the session. As an example, the session ID is retrieved by the client device and together with a URL that links uniquely to a login interface hosted by the computer system, is embedded into a computer-readable authentication code that is generated by the client device and is read by the trusted mobile device.

According to block 1006, the gateway server receives from the mobile device a user name and a password that are associated with the URL. For example, the user name and the password associated with the URL are fetched by the client device to login into the computer system.

Figure 11:
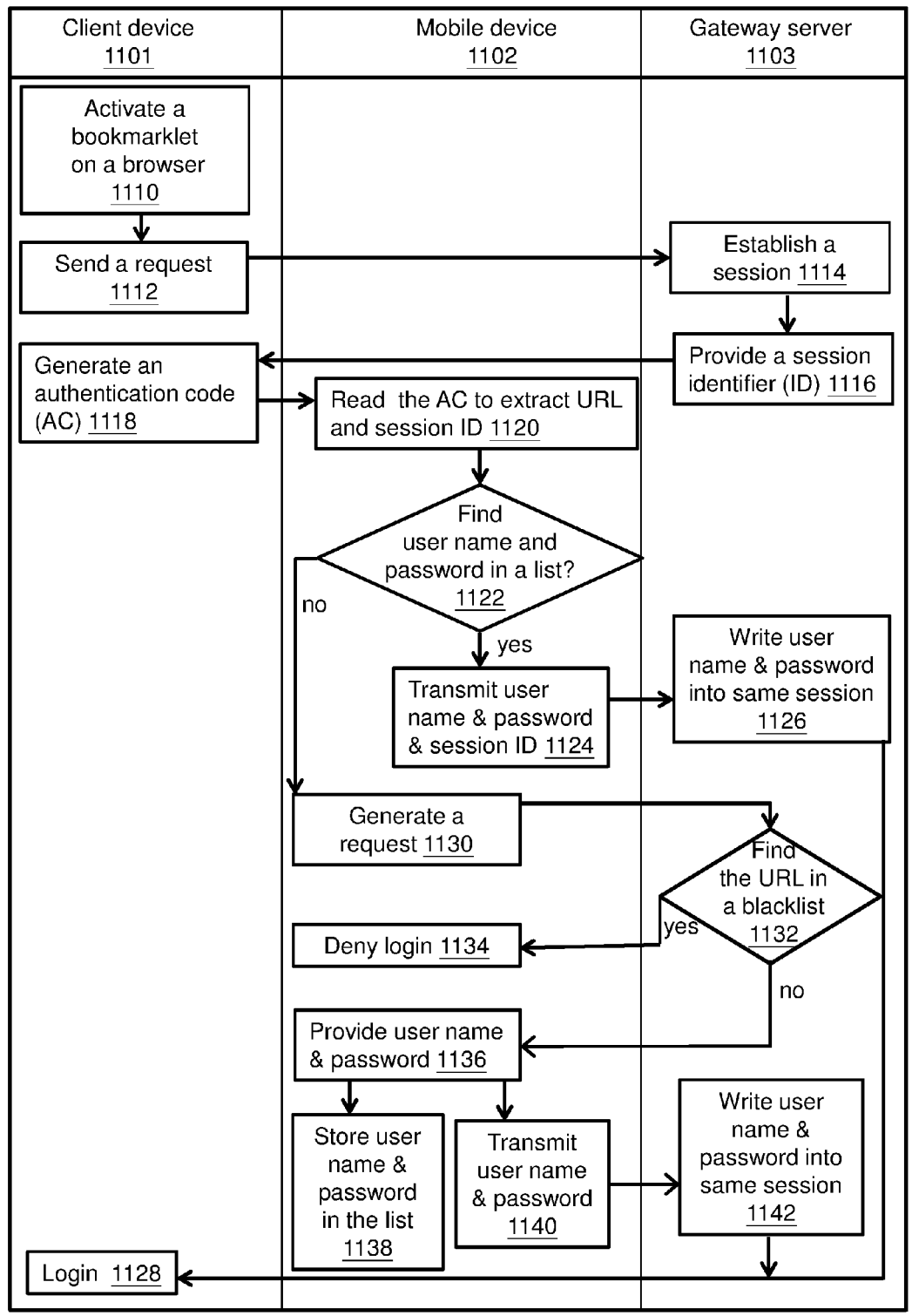
FIG. 11 is a swim lane diagram illustrating an example method in accordance with an example embodiment.

FIG. 11 is a swim lane diagram illustrating an example method in accordance with an example embodiment. The swim lane illustrates how a mobile device 1102 (such as a smart phone) authenticates a user to login with a client device 1101 (such as a desktop computer) to a computer system (herein using a web server hosting one or more websites as an example) through a secure gateway server 1103 as a communication intermediary. The mobile device 1102 stores a list of URLs and user credentials and verifies whether a URL is authentic or trustworthy by determining whether the URL is in the list before providing corresponding user credentials through the gateway server 1103 as a communication tunnel to the client device 1101 for login. The steps or mechanisms as shown in FIG. 11 is for illustrative purpose only, and a person having ordinary skill in the art would recognize various alterations and modifications that can implement example embodiments.

At block 1110, when attempting to login to a website that presents a webpage with a unique URL, a user activates (e.g. clicks) a bookmarklet that is embedded into a web browser to generate a request. At block 1112, the request is sent to the gateway server 1103. At block 1114, upon receipt of the request, the gateway server establishes a session (e.g. a one-time random session) that helps communication between the mobile device 1102 and the client device 1101. Meanwhile, at block 1116, the gateway server generates a session ID that is used to identify the session. Upon knowing the session is ready by polling status of the gateway server 1103, at block 1118, the client device 1101 retrieves the session ID from the gateway server 1103 and generates an authentication code (e.g. a barcode) that embeds information such as the session ID and the URL.

At block 1120, the mobile device 1102 reads (e.g. scans with a scanner or camera) the authentication code to extract the URL and the session ID. To verity the URL, at block 1122, the mobile device 1102 searches in its list to look for user credentials (herein using user name and password as an example) associated with the URL. When the user name and the password are found, the step goes to block 1124 in which the user name and the password together with the session ID are transmitted to the gateway server 1103. The gateway server 1103 identifies the session with the session ID, and at block 1126, the gateway server writes the user name and the password into the same session. At block 1128, the client device 1101 knows the user credentials are ready by consistently polling status of the gateway server 1128, and fetches the user name and the password such that the user is authenticated to login to the website.

When the user name and the password are not found in the list of the mobile device 1102 at block 1122, the step goes to block 1130 in which a request is generated at the mobile device 1102 and transmitted to the gateway server 1103. Upon receipt of the request from the mobile device 1102, at block 1132, the gateway server 1103 searches the URL in a blacklist in the gateway server 1103. A URL is considered by users as fake or risky or untrustworthy when the URL is in the blacklist.

When the URL is found in the blacklist at block 1132, the URL is regarded as a fake or risky URL, and the step goes to block 1134 where the mobile device 1102 denies the user to login to the website at the client device 1101. As an example, a denial message is generated and retrieved by the client device 1101 through the gateway server 1103 such that the user is denied to login to the website at the client device 1101.

When the URL is not found in the blacklist at block 1132, the step goes to block 1136 where the mobile device 1102 considers the URL new and considers the login as a first-time login, and provides a user name and a corresponding password (e.g. inputting manually by the user). On one hand, the URL, the user name and the password that are associated with the URL are stored in the list of the mobile device 1102 at block 1138. On the other hand, the user name and the password, together with the session ID are transmitted to the gateway server 1103 at block 1140. At block 1142, the gateway server 1103 writes the user name and the password into the same session such that the user name and the password are retrieved by the client device 1101 for login.

Alternatively and optionally, when the user name and the password are not found in the list of the mobile device 1102 at block 1122, the mobile device 1102 does not request the gateway server 1103 to search the URL in the blacklist, and instead, the mobile device 1102 denies the user to login to the website at the client device 1101. This can be done automatically or manually by activating a trigger (such as a button) of the mobile device 1102 by the user.

Alternatively and optionally, when the user name and the password are not found in the list of the mobile device 1102 at block 1122, the mobile device 1102 does not request the gateway server 1103 to search the URL in the blacklist, and instead, the user name and the password are provided manually by the user and transmitted to the gateway server 1103 and retrieved by the client device 1101 for login. Further, the URL, the user name and the password that are associated with the URL are stored in the list of the mobile device 1102.

Alternatively and optionally, when the user name and the password are not found in the list of the mobile device 1102 at block 1122, a voting on the URL is conducted at the mobile device 1102 to generate a counter value that is associated with the URL. The URL and the counter value are transmitted to the gateway server 1103 that writes the URL and the counter value into a blacklist of the gateway server 1103, where the counter value increments a voting number of the URL in the blacklist by one, and the voting number indicates a number of users that consider the URL as fake. Generation of a counter value at the mobile device 1102 can be done automatically or manually by activating a counter button on a user interface of the mobile device 1102 by the user.

Alternatively and optionally, when the URL is found in the blacklist of the gateway server 1103 at block 1132, the mobile device 1102 determines whether a number of votes (or voting number) that indicate a number of users that consider the URL as fake exceeds a threshold, and denies the user login to the website when the number of votes exceeds the threshold. In an example embodiment, the threshold is 30. When the mobile device 1102 determines from a return result of searching in the blacklist that the number of votes is 43 indicating 43 users considering the URL fake, the mobile device 1102 denies the user login to the website with the client device.

Alternatively and optionally, the mobile device 1101 generates a timestamp to add another layer of security such that the mobile device 1101 is only allowed to login the client device 1101 to the website during a specified period (such as in March 2017)

Alternatively and optionally, the mobile device 1101 generates a geographical indicator to add another layer of security such that the mobile device 1101 is only allowed to login the client device 1101 to the website within a geographical boundary (e.g. within Macau).

Alternatively and optionally, at block 1120, the mobile device 1102 reads the authentication code by receiving, through a microphone in the mobile device, a sound that is played by the client device 1101 to indicate the authentication code, and determining the authentication code from the sound.

Alternatively and optionally, before transmitting the user name and the password together with the session ID to the gateway server 1103, the mobile device 1102 encodes and encrypts (such as using Advanced Encryption Standard (AES) 256 and RAS, etc.) the user name and the password. Upon retrieval of the user name and the password from the gateway server 1103, the encoded and encrypted user name and the password are decoded and decrypted at the client device for login.

Figure 12:
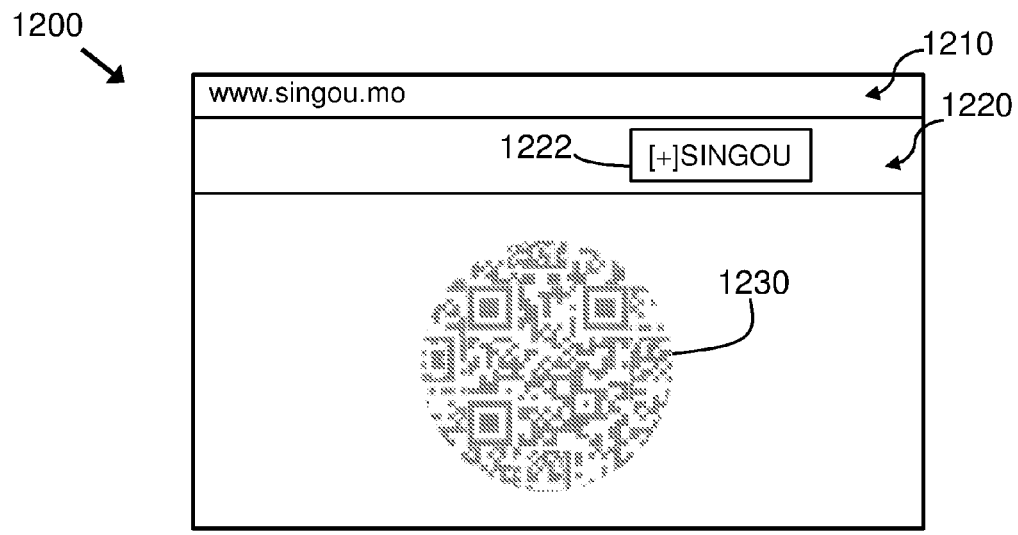
FIG. 12 is a graph illustrating a login interface of a client device in accordance with an example embodiment.

FIG. 12 is a graph illustrating a login interface at a client device in accordance with an example embodiment. A person having ordinary skill in the art would appreciate FIG. 12 is for illustrative purpose only and would recognize various alterations and modifications within scope of example embodiments.

The login interface (e.g. browser interface) includes a column 1210 that displays a webpage (e.g., "www.singou.mo") corresponding to a unique URL, a bookmark column 1220 that includes a bookmarklet 1222 (shown as "[+]SINGOU"), and an authentication code 1230 (shown as a QR code) that is generated in response to retrieval of a session ID from a gateway server. The authentication code 1230 includes information such as a session ID and the URL that are to be obtained by a mobile device when reading (e.g. scanning) the authentication code 1230.

Figure 13:
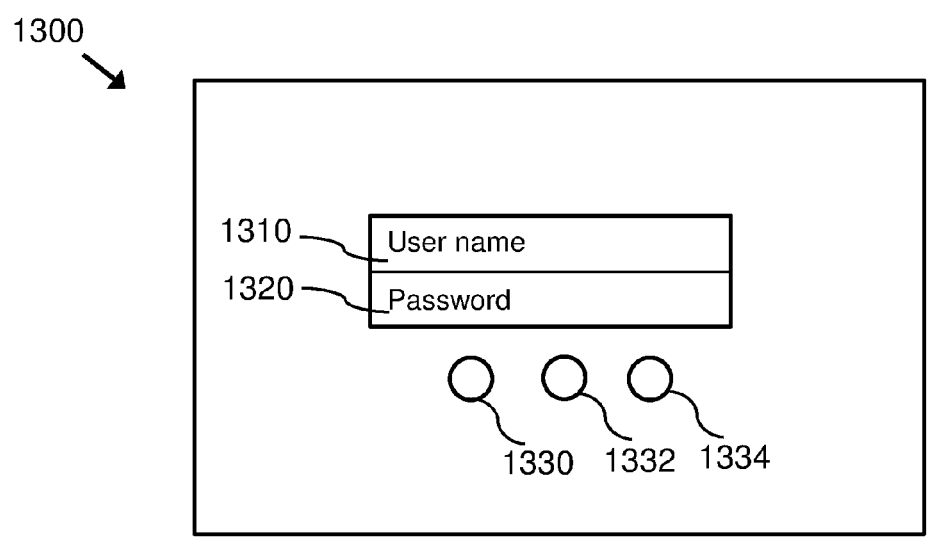
FIG. 13 is a graph illustrating a user interface at a mobile device in accordance with an example embodiment.

FIG. 13 is a graph illustrating a user interface at a mobile device in accordance with an example embodiment.

The user interface 1300 includes a block 1310 for inputting a user name, a block 1320 for inputting a password, and one or more triggers or buttons 1330, 1332, and 1334.

As an example, when no user name and password associated with a URL that is extracted from an authentication code displayed by a client device is found in a list of URLs, user names and password in the mobile device, a user inputs a user name and a password into blocks 1310 and 1320 respectively.

The one or more buttons perform a variety of functions. For example, in response to activation of the button 1330, the mobile device stores a URL, a user name and a password associated with the URL into the list in the mobile device. In response to activation of the button 1332, the mobile device denies login to a computer system. In response to activation of the button 1334, the mobile device generates a counter value associated with a URL for voting the URL.

Figure 14:
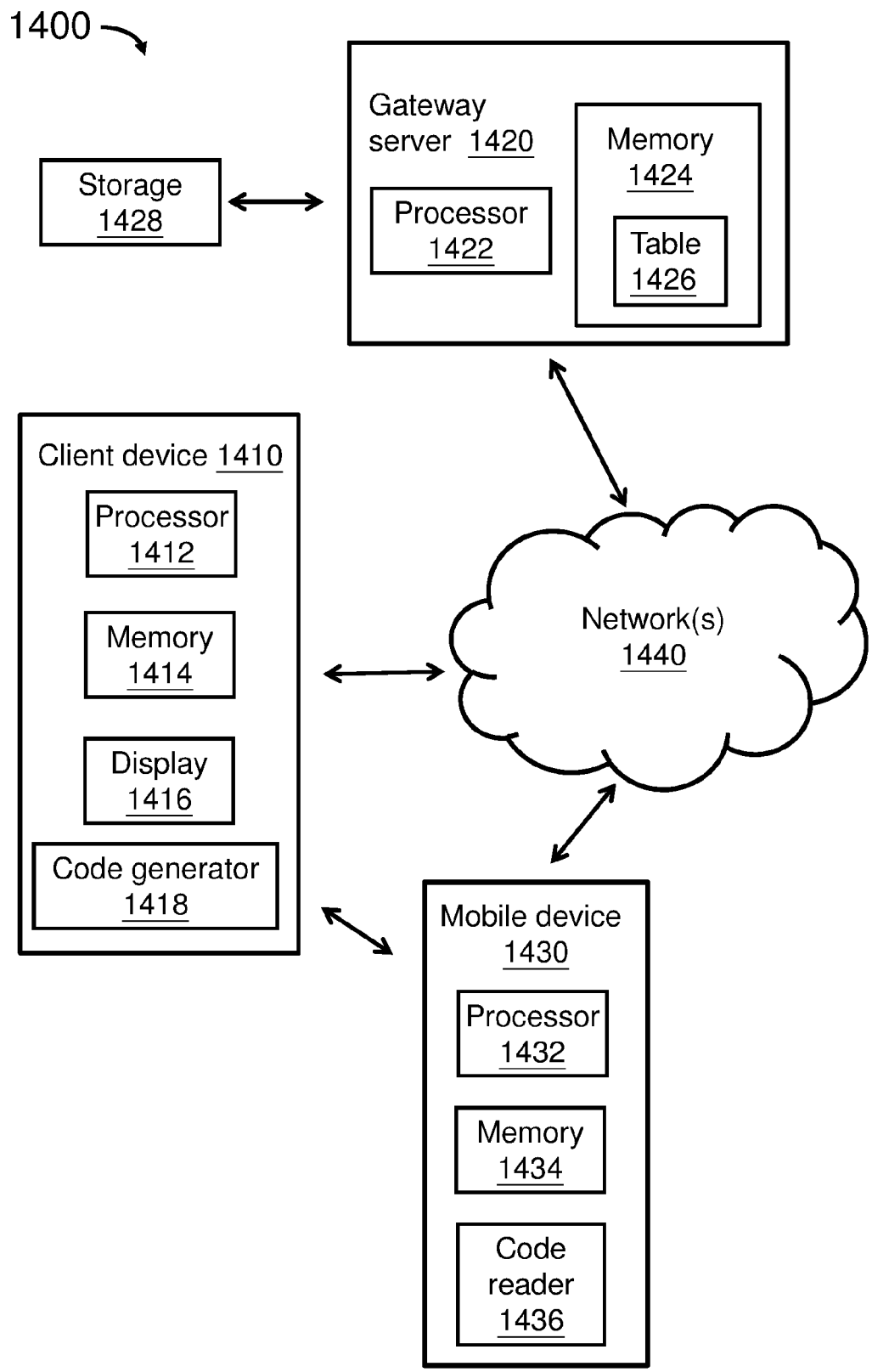
FIG. 14 is a graph illustrating an authentication system in accordance with an example embodiment.

FIG. 14 is a graph illustrating an authentication system in accordance with an example embodiment. The authentication system 1400 executes one or more example methods at stated herein. For example, the authentication system 1400 executes one or more example methods as stated with reference to FIG. 11.

The authentication system 1400 includes a client device or client terminal 1410, a gateway server 1420, a mobile device 1430. Both the client device 1410 and the mobile device 1430 communicate with the gateway server 1420 via one or more networks 1440.

The client device 1410 includes a processor or processing unit 1412 (such as one or more processors, microprocessors, and/or microcontrollers), one or more components of computer readable medium (CRM) or memory 1414, a user interface (such as a display) 1416, and a code generator 1418. The memory 1414 stores instructions or software that when executed cause the processor 1412 to execute one or more methods or functions implemented at the client device 1410. The code generator 1418 generates an authentication code that is displayed by the display 1416.

The gateway server 1420 includes a processor or processing unit 1422 (such as one or more processors, microprocessors, and/or microcontrollers), one or more components of computer readable medium (CRM) or memory 1424. The memory 1424 stores instructions or software that when executed cause the processor 1422 to execute one or more methods or functions implemented at the gateway server 1420, such as example methods as stated with reference to FIG. 10.

In an example embodiment, the memory 1424 includes a table 1426 that stores a session ID that is fetched by the client device 1410 to identity a session established by the gateway server 1420.

In an example embodiment, the gateway server 1420 includes one or more non-transitory storage devices or storage 1428. Without limitation, the storage 1428 can be local and/or network accessible storage, which includes, but not limited to, a disk drive, a drive array, an optical storage device, a solid-state storage device, such as a random access memory (RAM), a read-only memory (ROM), which can be programmable, or flash-updateable, etc. As an example, the storage 1428 implements appropriate data stores such as various file systems, and database structures etc.

Alternatively and optionally, the storage 1428 is separate from the gateway server 1420 (e.g. removable), or provided in an installation package such that the storage 1428 is used to program, configure, and/or adapt a general purpose computer with instructions/codes stored thereon. Alternatively, the storage 1428 communicates with the gateway server 1420 over one or more networks.

The mobile device 1430 includes a processor or processing unit 1432 (such as one or more processors, microprocessors, and/or microcontrollers), one or more components of computer readable medium (CRM) or memory 1434. The memory 1434 stores instructions or software that when executed cause the processor 1432 to execute one or more methods or functions implemented at the mobile device 1430, such as example methods as stated with reference to FIG. 9. These instructions or software can take the form of executable code, which is executed by the processor 1432, and/or take the form of source and/or installable code, which, upon compilation and/or installation on the mobile device 1430 (e.g., using one of a variety of generally available compilers, installation programs, compression/decompression utilities, etc.) followed by taking form of executable code.

Figure 15:
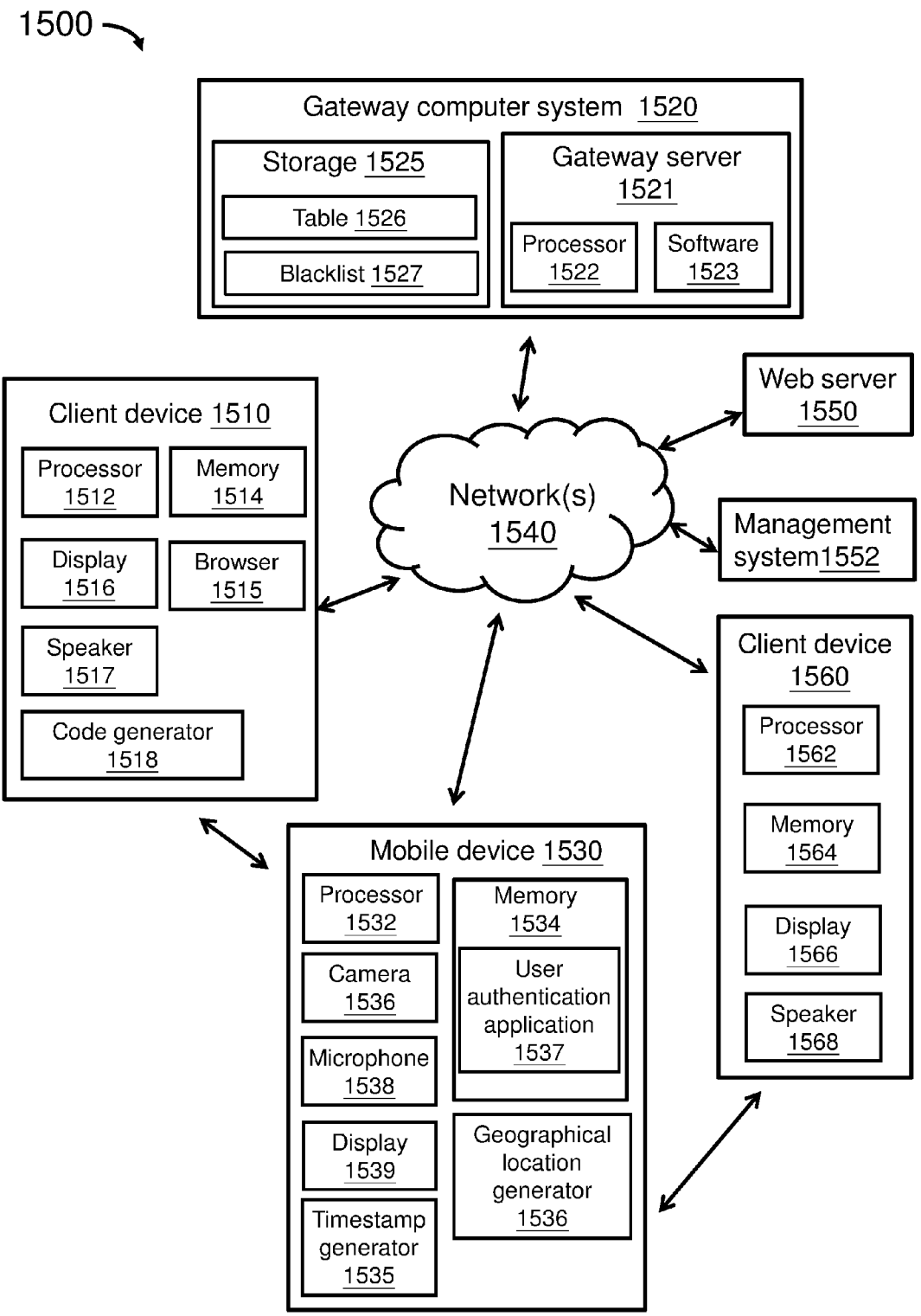
FIG. 15 is a graph illustrating an authentication system in accordance with an example embodiment.

The mobile device 1430 also includes a code reader 1436 that reads an authentication code provided by the client device 1410. As an example, the code reader 1436 is a scanner or camera that scans a QR code displayed on the client device 1410 to extract information such as user credentials embedded in the QR code. FIG. 15 is a graph illustrating an authentication system in accordance with an example embodiment. The authentication system 1500 executes one or more example methods as stated herein. For example, the authentication system 1500 executes one or more example methods as stated with reference to FIG. 11.

As illustrated, the authentication system 1500 includes a client device 1510, a gateway computer system 1520, a mobile device 1530, a web server 1550, a management system 1552, and one or more networks 1540.

The client device 1510 includes a processor 1512, a memory 1514, a browser 1515 that presents a login interface (e.g. webpage or management system login interface) of a resource (e.g. website hosted by the web server 1550, or a link page hosted by the management system 1552), a code generator 1518 that generates an authentication code, a display 1516 that displays the authentication code, and a speaker 1517 that plays sound to indicate the authentication code such that the authentication code is determined by the mobile device 1530 from the sound.

The gateway computer system 1520 includes a gateway server 1521 and storage 1525. The gateway server 152 includes a processor 1522 and software 1523 that when executed causes the processor 1522 to execute one or more methods or functions implemented at the gateway server 1521. The storage 1525 includes a table 1526 that stores information such as session IDs, and a blacklist 1527 that stores URLs that are considered as unsecure or fake and voting numbers that indicate how many users consider a URL as fake.

The mobile device 1530 includes a processor 1532 and a memory 1534 that stores a user authentication application 1537 that when executed causes the processor 1532 to execute one or more methods or functions implemented at the mobile device 1530.

As shown, the mobile device 1530 further includes a camera 1536 that scans an authentication code generated by the client device 1510, a microphone 1538 that captures or receives sound that is played by the client device 1510 to determine an authentication code generated by the client device 1510, a display as an user interface on which a user performs various operations such as activating one or more buttons as stated with reference to FIG. 13.

Alternatively and optionally, as shown in FIG. 15, the mobile device 1530 includes a timestamp generator 1535 and a geographical location generator 1536. The timestamp generator 1535 creates a timestamp that indicate a period during which the mobile device 1530 is allowed to be used to authenticate a user to login with the client device 1510 to a computer system such as a web server 1550 and a management system 1552. The geographical location generator 1536 generates a geographical indicator that indicates a geographical boundary within which the mobile device 1530 is allowed to be used to authenticate a user to login with the client device 1510 to a computer system such as a web server 1550 and a management system 1552.

Alternatively and optionally, as shown in FIG. 15, the authentication system 1500 includes a second client device 1560 that includes a processor 1562, a memory 1564, a display 1566, and a speaker 1568.

In an example embodiment, a firm is located in a first city (e.g. Macau). When a boss is travelling in a second city (e.g. New York) and the boss's secretary needs to login with the client device 1510 to the firm's private management system on behalf of the boss to handle an urgent case, a QR code is generated at the client device 1510 and is sent by the secretary to the client device 1560 with which the boss is via network media (such as email, WhatsApp, Wechat etc.). The boss authenticates the secretary to login by reading the QR code displayed on the client device 1560 with the mobile device 1530 carried by the boss. Alternatively, the QR code is received and displayed directly on the mobile device 1530 carried by the boss, and read by the mobile device 1530 with assistance of software included.

The network 1540 can include one or more of a cellular network, a public switch telephone network, the Internet, a local area network (LAN), a wide area network (WAN), a metropolitan area network (MAN), a personal area network (PAN), home area network (HAM), and other public and/or private networks.

In some example embodiments, the methods illustrated herein and data and instructions associated therewith, are stored in respective storage devices that are implemented as non-transitory computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape;

optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

The methods in accordance with example embodiments are provided as examples, and examples from one method should not be construed to limit examples from another method. Figures and other information show example data and example structures; other data and other database structures can be implemented with example embodiments. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

As used herein, "Uniform Resource Locator" or "URL" is a reference to a resource (e.g. a website hosted by a wet server, a user account hosted by an organization's management system, etc.) that specifies its location on a computer system (e.g. a computer network, a web server, an organization's management system) and a mechanism for retrieving the resource.

As used herein, "one-time random session" is using randomly generated numbers as session variables to identify a session that is used temporarily or within a specified period.

As used herein, a "blacklist" is a list in a gateway server and the list includes one or more URLs that are considered as untrustworthy or fake.

What is claimed is:

1. A method that improves authentication of a user to login with a client device to a computer system, the method comprising:

reading, by a mobile device that stores a list of Uniform Resource Locators (URLs), user names and passwords, an authentication code displayed on a display of the client device to extract a URL and a session identifier (ID) that corresponds to a session established by a gateway server;

searching, by the mobile device, a user name and a password associated with the URL in the list of URLs, user names and passwords;

transmitting, by the mobile device and when the user name and the password associated with the URL are found in the list of URLs, user names and passwords, the user name, the password, and the session ID to the gateway server;

authenticating the user to login to the computer system with the client device when the client device retrieves from the gateway server the user name and the password transmitted by the mobile device to the gateway server;

generating, by the mobile device and when the user name and the password associated with the URL are not found in the list of URLs, user names and passwords, a request to the gateway server such that the gateway server searches the URL in a blacklist of the gateway server that stores one or more URLs;

determining, by the mobile device and when the URL is found in the blacklist of the gateway server, whether a number of votes that indicate a number of users that consider the URL as fake exceeds a threshold;

denying the client device access to the computer system when the number of votes exceeds the threshold;

receiving, on a user interface of the mobile device and when the user name and the password associated with the URL are not found in the list of URLs, user names and passwords and when the number of votes does not exceed the threshold, the user name and the password associated with the URL; and storing, by the mobile device, the URL, the user name and the password in the list of URLs, user names and passwords.

2. The method of the claim 1, further comprising:

voting, on a user interface of the mobile device and when the user name and the password associated with the URL are not found in the list of URLs, user names and passwords, the URL by activating a counter button to generate a counter value that is associated with the URL; and transmitting, by the mobile device, the URL and the counter value to the gateway server that writes the URL and the counter value into a blacklist of the gateway server, wherein the counter value increments a voting number of the URL in the blacklist by one, and the voting number indicates a number of users that consider the URL as fake.

3. The method of the claim 1 further comprising:

scanning, with a camera in the mobile device, the authentication code that is displayed on the display of the client device as a Quick Response (QR) code to extract the session ID and the URL.

4. The method of the claim 1 further comprising:

receiving, at the client device, activation of a bookmarklet that executes a command to generate the authentication code as a machine readable barcode that is displayed to the mobile device.

5. A method that improves authentication of a client device that logins into a computer system, the method comprising:

receiving, at a gateway server, a request to login the client device to the computer system;

establishing, by the gateway server and in response to the request from the client device, a session that corresponds to a session identifier (ID) such that the session ID is retrieved by the client device to create a computer-readable authentication code that includes the session ID and a Uniform Resource Locator (URL) that is provided by the client device for login into the computer system;

receiving, by the gateway server and from a mobile device, a user name and a password that are retrieved from a list of URLs, user names and passwords in the mobile device and are associated with the URL such that the user name and the password are fetched by the client device to login into the computer system;

generating, by the mobile device and when the user name and the password associated with the URL are not found in the list of URLs, user names and passwords, a request to the gateway server such that the gateway server searches the URL in a blacklist of the gateway server that stores one or more URLs;

determining, by the mobile device and when the URL is found in the blacklist of the gateway server, whether a number of votes that indicate a number of users that consider the URL as fake exceeds a threshold;

denying the client device access to the computer system when the number of votes exceeds the threshold;

receiving, on a user interface of the mobile device and when the user name and the password associated with the URL are not found in the list of URLs, user names and passwords and when the number of votes does not exceed the threshold, the user name and the password associated with the URL; and storing, by the mobile device, the URL, the user name and the password in the list of URLs, user names and passwords.

6. The method of the claim 5, further comprising:

conducting, by the gateway server and in response to receipt of a request from the mobile device, a search in a blacklist of the gateway server to determine whether there is a same URL in the blacklist.

7. The method of the claim 5, further comprising:

receiving, through a microphone in the mobile device, a sound that is played by the client device to indicate the authentication code; and determining, by the mobile device and from the sound, the authentication code.

8. The method of the claim 5, further comprising:

transmitting, by the client device, the computer-readable authentication code to a second client device;

displaying, by the second client device, the computer-readable authentication code; and reading, by the mobile device, the computer-readable authentication code displayed on the second client device in order to authenticate the client device to login into the computer system.

9. An authentication system that improves how users authenticate to a computer system, comprising:

a client device with a display that displays an authentication code;

a gateway server that includes a memory that stores a blacklist of URLs and session identifiers (IDs) corresponding to sessions that are established in response to requests from the client device; and a mobile device that communicates with the gateway server over a network and includes:
a processor;
a memory that stores a list of Uniform Resource Locators (URLs), user names and passwords; and
an authentication reader that reads the authentication code from the display of the client device to obtain a session ID and a URL that are embedded in the authentication code, wherein the session ID corresponds to a session that is established by the gateway server, wherein the mobile device searches in the memory of the mobile device to determine whether a user name and a password that are associated with the URL exist;

and wherein the memory of the mobile device includes instructions that when executed cause the processor to:

transmit, in response to existence of the user name and the password that are associated with the URL, to the gateway server the user name and the password that are further fetched by the client device such that the client device is granted to login into the computer system;

request, in response to non-existence of the user name and the password that are associated with the URL, the gateway server to determine whether there is a same URL in the blacklist of the gateway server;

deny the access of the client device to the computer system when there is a same URL in the blacklist of the gateway server and a number of votes for the URL exceeds a threshold; and receive and store, on the mobile device and when the user name and the password associated with the URL are not found in the list of URLs, user names and passwords and when the number of votes does not exceed the threshold, the user name and the password associated with the URL.

10. The authentication system of claim 9, wherein the computer system is a web server that hosts a website, and the client device includes a web browser and a bookmarklet, wherein the client device requests the gateway server to establish the session in response to an activation of the bookmarklet, and wherein the client device receives from the gateway server the section ID that corresponds to the session and embeds the section ID and the URL into the authentication code that is generated by an authentication code generator that is included in the client device.

11. The authentication system of claim 9, wherein the authentication code is a symbolic code, and wherein the mobile device includes a camera that scans the authentication code to extract the section ID.

\* \* \* \* \*